: 3,468,959
SEPARATION OF CESIUM FROM POTASSIUM AND RUBIDIUM

Carl E. Moore, Morton Grove, Frank P. Cassaretto, Evanston, John J. McLafferty, Gurnee, and Harvey W. Posvic, Cicero, Ill., assignors to Research Corporation, New York, N.Y., a nonprofit corporation of New York
No Drawing. Filed Oct. 17, 1966, Ser. No. 586,933
Int. Cl. C07f 5/02
U.S. Cl. 260—606.5      2 Claims

ABSTRACT OF THE DISCLOSURE

Cesium is selectively precipitated from a solution containing cesium and potassium or rubidium cations by additions of a solution containing tetrakis-(p-fluorophenyl)borate anions.

---

The present invention relates to sodium tetrakis-(p-fluorophenyl)borate and to its use as a selective precipitant for cesium.

Interest in cesium metal and its compounds has increased as a result of recent advances in space age technology. Generally speaking, cesium salts occur in nature as complex salts, double salts or mixed crystals particularly with other alkali metal compounds. The best source of cesium currently known is the rare mineral pollucite usually found in pegmatites. While the cesium oxide content of pure pollucite is 42.5%, it usually runs from about 6 to 32% in actual ores. Varying amounts of other alkali metal impurities are present as replacement elements in the pollucite crystal structure or in accessory minerals that accompany pollucite when it is mined. The separation of cesium values from other alkali metal values such as potassium or rubidium is important both in analysis and in the isolation and purification of the metal and its compounds.

Sodium tetraphenylborate forms insoluble precipitates with and has been used in the quantitative determination of potassium, rubidium and cesium. U.S. Patent 2,853,525 to Wittig et al. We have prepared sodium tetrakis(p-fluorophenyl)borate and discovered that it has the unexpected property of selectively precipitating cesium ions in the presence of potassium and other alkali metal ions.

It is therefore, a principal object of the present invention to provide a novel method for the selective precipitation of cesium ions in the presence of potassium and other alkali metal ions.

It is another object of the invention to provide a method for the analysis of cesium in the presence of potassium.

It is a further object of the present invention to provide a method for the isolation and purification of cesium.

It is still another object of the present invention to provide sodium tetrakis-(p-fluorophenyl)borate, a novel compound useful in the selective precipitation of cesium.

In one specific process aspect, the present invention is a method for separating cesium and potassium which comprises adding a solution containing tetrakis-(p-fluorophenyl)borate anions to a solution containing cesium cations and potassium cations thereby selectively precipitating the cesium cations, and separating the resultant precipitate of cesium tetrakis-(p-fluorophenyl)borate.

In another specific process aspect, the present invention is a method for separating cesium and rubidium which comprises adding a solution containing tetrakis-(p-fluorophenyl)borate anions to a solution containing cesium cations and rubidium cations thereby selectively precipitating the cesium cations and a minor portion of the rubidium cations, and separating the resultant precipitate of cesium tetrakis-(p-fluorophenyl)borate containing a minor amount of rubidium tetrakis-(p-fluorophenyl)borate.

Sodium tetrakis-(p-fluorophenyl)borate is synthesized by reacting p-fluorobromobenzene with magnesium or lithium to form the corresponding magnesium bromide Grignard reagent or organo lithium compound. The action of sodium borofluoride on the organo metallic compound produces the tetrakis-(p-fluorophenyl)borate. Solutions of the salt selectively and essentially quantitatively precipitate cesium cations from solutions thereof even in the presence of other alkali metal cations. The cesium values can be recovered from cesium tetrakis-(p-fluorophenyl)borate by acid precipitation under conditions which would destroy the borate, or by ion exchange in an alkaline system wherein the borate may be recovered. The electrolytic or chemical reduction of cesium compounds to the metal is well known.

My invention is further illustrated by means of the following examples showing the preparation of sodium tetrakis-(p-fluorophenyl)borate and its use in the selective precipitation of cesium cations:

To a 500 ml. 3-necked flask equipped with a stirrer, water-cooled condenser and a dropping funnel, there was added 9.7 g. (0.4 mole) of magnesium turnings. After sweeping the system with dry nitrogen, 250 ml. of ether, previously dried over sodium, was added to the reaction flask. A solution of 70 g. (0.4 mole) of p-bromofluorobenzene in 100 ml. of dry ether was then added in two portions. A first portion containing approximately 10 ml. of the solution was added with stirring and the reaction mixture brought to reflux temperature. After reaction starts, generally within 20 minutes, the remainder of the p-bromofluorobenzene solution was added dropwise over a period of one hour. Stirring and refluxing of the reaction mixture was continued for an additional hour.

To the cooled solution of the p-fluorophenyl Grignard reagent under nitrogen, there was added with stirring 11.0 g. (0.1 mole) of sodium borofluoride, previously dried for one hour at 110° C. After refluxing for two hours, the reaction mixture was poured into 400 ml. of ice-cold saturated sodium chloride solution. A white precipitate of inorganic material formed in the aqueous layer. The ether layer was separated and the aqueous layer extracted three times with 100 ml. portions of ether. The ether extracts were combined, 300 ml. of xylene added and the ether removed by evaporation in vacuo. The salt separated as a yellow solid weighing 20.8 g. In some experiments, the product separated as a yellow oil which solidified on standing.

The pure sodium salt was obtained by dissolving 10 g. of the crude product in 100 ml. water, filtering to remove any undissolved solids and passing through a cation exchange column, e.g., a sulfonated, cross-linked polystyrene resin such as Dowex 50 W, employed in its sodium form and preferably washed with 4% sodium hydroxide. The eluate, about 250–275 ml., was saturated with sodium chloride and extracted with three 50 ml. portions of ether. The extracts were combined, 200 ml. of dry xylene added and the ether evaporated in vacuo. Crystals of the white sodium salt started to appear when most of the ether had been removed. The purified salt, as the dihydrate, was obtained in a 7.9 g. yield.

An analysis of the dihydrate yielded the following result: $H_2O$ by Karl Fisher titration 7.85%; Calculated: $H_2O$ 8.00%. The anhydrous salt analyzed as follows: C, 69.55%, H 3.85, F 18.54; Calculated: C 69.60, H 3.89, F 18.35.

Sodium tetrakis-(p-fluorophenyl)borate was tested for its ability to precipitate the cesium cation by mixing 2 ml. of a 0.03 molar solution of the reagent with 2 ml. of test solution containing small amounts of cesium. A test solution containing 2.0 mg. of cesium gave an immediate heavy precipitate, a solution containing 0.2 mg. gave an immediate medium precipitate, and solutions containing 0.1 mg. and 0.05 mg. slowly gave a slight precipitate. No precipitate was obtained when the test solution contained less than 0.02 mg. of cesium.

A 2% solution of sodium tetrakis-(p-fluorophenyl)-borate in water was used in the following quantitative study. The sample containing the Cs+ ion was adjusted to 50 ml. and brought to 70° C. The reagent, usually about 40 ml., was added slowly from a pipet. The sample was allowed to stand at room temperature for one hour, immersed in an ice bath for one hour, transferred to a fine sintered glass filtering crucible and washed with three 5 ml. portions of ice water. The crucible was dried for one hour at 110° C., cooled in a desiccator, weighed and the recovery of Cs calculated using the theoretical gravimetric factor 0.2536. The results are summarized below:

RECOVERY OF CESIUM FROM PURE CESIUM SOLUTIONS

| Taken (mg. Cs) | Found (mg. Cs) | Percent recovery |
| --- | --- | --- |
| 65.3 | 64.5 | 98.8 |
| 65.3 | 64.3 | 98.5 |
| 32.7 | 32.5 | 99.4 |
| 32.7 | 32.2 | 98.5 |
| 32.7 | 32.2 | 98.5 |
| 32.5 | 32.0 | 98.5 |
| 32.5 | 31.9 | 98.2 |
| 32.5 | 31.9 | 98.2 |
| 32.5 | 31.8 | 97.8 |
| 16.3 | 16.0 | 98.2 |
| 16.3 | 16.2 | 99.4 |
| 16.2 | 16.0 | 98.8 |
| 16.2 | 15.9 | 98.1 |

Similar experiments were made in which potassium or rubidium ions were present in the sample. The amounts of potassium or rubidium added and the results obtained are summarized below:

RECOVERY OF CESIUM IN THE PRESENCE OF POTASSIUM

| Taken (mg. Cs) | Taken (mg. K) | Found (mg. Cs) Gravimetric | Found (mg. K+) | Corrected result (mg. Cs) |
| --- | --- | --- | --- | --- |
| 32.5 | 11.9 | 32.0 | .02 | 32.0 |
| 32.5 | 11.9 | 32.0 | .02 | 32.0 |
| 32.5 | 23.8 | 32.0 | .04 | 31.9 |
| 32.5 | 23.8 | 31.9 | .03 | 31.8 |
| 32.5 | 23.8 | 31.8 | | |
| 32.5 | 23.8 | 31.8 | | |
| 32.7 | 23.8 | 32.3 | | |
| 32.5 | 35.7 | 32.2 | .06 | 32.0 |
| 32.5 | 35.7 | 32.1 | .06 | 32.0 |

RECOVERY OF CESIUM IN THE PRESENCE OF RUBIDIUM

| Taken (mg. Cs) | Taken (mg. Rb) | Found (mg. Cs) Gravimetric | Found (mg. Rb) | Corrected result (mg. Cs) |
| --- | --- | --- | --- | --- |
| 32.5 | 2.8 | 32.3 | .22 | 32.0 |
| 32.5 | 2.8 | 32.3 | .20 | 32.0 |
| 32.5 | 8.5 | 33.2 | .63 | 32.3 |
| 32.5 | 8.5 | 33.2 | .71 | 32.2 |
| 32.5 | 14.1 | 33.8 | 1.25 | 32.0 |
| 32.5 | 14.1 | 33.7 | 1.13 | 32.1 |
| 32.5 | 14.1 | 33.8 | | |

The preceding table shows the precipitation of about 99% of the cesium and only 7–9% of the rubidium present. This precipitation procedure may be used in conjunction with other separation procedures or repeated until cesium of the desired degree of purity is obtained. For example, the cesium may be recovered from the cesium-containing precipitate as described above and reprecipitated from solution with additional tetrakis-(p-fluorophenyl)borate.

The solubility of pure cesium tetrakis-(p-fluorophenyl)borate was determined at 25° and at 0° C. At 25° C. the observed solubility was essentially unaffected by pH in the range 3.3–9.5. The results, which were computed from flame photometric measurements on the cesium cation in solution, were taken after 30 hours. Long equilibration times were not employed because of possible decomposition of the precipitate; solubility results obtained shortly after precipitation were essentially the same as the 30 hour results summarized below:

SOLUBILITY OF CESIUM TETRAKIS-(p-FLUOROPHENYL)BORATE

| pH | Temperature (° C.) | Solubility (g./l.) |
| --- | --- | --- |
| 3.3 | 25 | 0.17 |
| 7.2 | 25 | 0.24 |
| 7.3 | 25 | 0.18 |
| 9.5 | 25 | 0.17 |
| ~7 | 0 | 0.10 |

Cesium tetrakis-(p-fluorophenyl)borate separates as a white crystalline compound with good analytical characteristics. It is easily filterable and achieves constant weight rapidly at 110° C. Prolonged heating for 18 hours caused no further weight loss or signs of decomposition. The theoretical factor for Cs of 0.2536 was used to compute the recovery figures reported above. As recovery values were 1–2% low, a compensating empirical factor may be employed.

When used for analytical purposes, the sodium tetrakis-(p-fluorophenyl)borate reagent is purified, for example, by passage through a cation exchange column. The crude magnesium-containing product may be employed without purification to recovery cesium from its ores.

While the process aspects of our invention have been illustrated particularly by means of sodium tetrakis-(p-fluorophenyl)borate, any soluble tetrakis - p - fluorophenyl)borate salt may be employed as the source of the tetrakis-(p-fluorophenyl)borate anion. Similar results are obtained by substitution, for example, of water soluble group I and II metal salts such as the lithium or magnesium salts for the sodium salt. These salts may be prepared by methods analogous to those employed for the preparation of the sodium salt, e.g., by reaction of the p-fluorophenyl organo metallic compound with a borofluoride as described above, or with a boron trihalide followed by an aqueous salt solution as described in U.S. Patent 2,853,525; or by oin exchange.

The above discussion and examples are offered for the purpose of illustration and are not intended to limit the scope of the invention. Our invention is as claimed.

We claim:

1. A method for separating cesium and potassium which comprises adding a solution containing tetrakis-(p-fluorophenyl)borate anions to a solution containing cesium cations and potassium cations thereby selectively precipitating the cesium ions, and separating the resultant precipitate of cesium tetrakis-(p-fluorophenyl)borate.

2. A method for separating cesium and rubidium which comprises adding a solution containing tetrakis-(p-fluorophenyl)borate anions to a solution containing cesium cations and rubidium cations thereby selectively precipitating the cesium cations and a minor portion of the rubidium cations, and separating the resultant precipitate of cesium tetrakis-(p-fluorophenyl)borate containing a minor amound of rubidium tetrakis-(p-fluorophenyl)borate.

References Cited

UNITED STATES PATENTS

| 2,853,525 | 9/1958 | Wittig et al. | 260—606.5 |
| 2,982,785 | 5/1961 | McKenzie | 260—606.5 |
| 3,096,370 | 7/1963 | Bloom et al. | 260—606.5 X |
| 3,187,054 | 6/1965 | Willcockson et al. | 260—606.5 |
| 3,311,662 | 3/1967 | Washburn et al. | 260—606.5 |

TOBIAS E. LEVOW, Primary Examiner

W. F. W. BELLAMY, Assistant Examiner

U.S. Cl. X.R.

23—25, 38; 75—121